US010204451B2

(12) United States Patent
Lanier et al.

(10) Patent No.: US 10,204,451 B2
(45) Date of Patent: Feb. 12, 2019

(54) MULTI-OPTICAL SURFACE OPTICAL DESIGN

(71) Applicant: Microsoft Technology Licensing, LLC, Redmond, WA (US)

(72) Inventors: Jaron Lanier, Berkeley, CA (US); Scott Lerner, Bellevue, WA (US); Joel S. Kollin, Seattle, WA (US); Andrew Maimone, Duvall, WA (US); Josh Hudman, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 85 days.

(21) Appl. No.: 14/953,600

(22) Filed: Nov. 30, 2015

(65) Prior Publication Data

US 2017/0154464 A1 Jun. 1, 2017

(51) Int. Cl.
*G06T 19/00* (2011.01)
*G02B 27/01* (2006.01)
*G02B 27/10* (2006.01)

(52) U.S. Cl.
CPC .......... *G06T 19/006* (2013.01); *G02B 27/017* (2013.01); *G02B 27/0172* (2013.01);
(Continued)

(58) Field of Classification Search
CPC ................ G06T 19/006; G02B 27/017; G02B 27/0172; G02B 27/0179; G02B 27/1006
(Continued)

(56) References Cited

U.S. PATENT DOCUMENTS 3,697,154 A 10/1972 Johnson
4,026,641 A 5/1977 Bosserman et al.
(Continued)

FOREIGN PATENT DOCUMENTS

CN 103261945 8/2013
WO WO1996008736 3/1996
(Continued)

OTHER PUBLICATIONS

Fischer, Robert E., "Fundamentals and Optics for Head Mounted Displays", Retrieved on: Sep. 11, 2015 Available at: http://fp.optics.arizona.edu/opti588/Presentation/Head-mountedDisplay/HMD_fundamentals_Fisher_JoseNotes.pdf, 27 pages.
(Continued)

*Primary Examiner* — James Greece
(74) *Attorney, Agent, or Firm* — Alleman Hall Creasman & Tuttle LLP

(57) ABSTRACT

A multi-optical surface optical design for generating multiple focal planes with identical image data displayed at substantially the same time to generate the perception of varying focal depths is described. The multi-optical surface optical design can include a device comprising reflective optical surfaces that can be arranged on top of one another and configured to generate multiple focal planes and an image source for projecting image data onto the reflective optical surfaces. The technologies described can cause image data to be rendered in a focal plane corresponding to a desired focal distance and multiple copies of the image can be perceived in other focal planes of the multiple focal planes at substantially the same time as the image data is rendered in the focal plane. Each copy of the multiple copies can be presented with a perceived degree of sharpness such that each copy is out-of-focus.

18 Claims, 8 Drawing Sheets

(52) U.S. Cl.
CPC ..... *G02B 27/0179* (2013.01); *G02B 27/1006* (2013.01); *G02B 2027/014* (2013.01); *G02B 2027/0118* (2013.01); *G02B 2027/0127* (2013.01); *G02B 2027/0138* (2013.01); *G02B 2027/0152* (2013.01); *G02B 2027/0185* (2013.01); *G02B 2027/0187* (2013.01)

(58) Field of Classification Search
USPC .......................................................... 359/630
See application file for complete search history.

(56) References Cited

U.S. PATENT DOCUMENTS

| | | | |
|---|---|---|---|
| 5,812,332 A * | 9/1998 | Freeman | B32B 3/02 359/894 |
| 6,152,563 A | 11/2000 | Hutchinson | |
| 6,222,677 B1 | 4/2001 | Budd et al. | |
| 6,307,526 B1 * | 10/2001 | Mann | G02B 27/017 345/7 |
| 8,248,458 B2 | 8/2012 | Schowengerdt et al. | |
| 2011/0075257 A1 * | 3/2011 | Hua | G02B 27/017 359/464 |
| 2013/0335404 A1 | 12/2013 | Westerinen et al. | |
| 2014/0003762 A1 | 1/2014 | Macnamara | |
| 2014/0160576 A1 | 6/2014 | Robbins | |
| 2014/0240843 A1 | 8/2014 | Kollin | |
| 2015/0205126 A1 | 7/2015 | Schowengerdt | |

FOREIGN PATENT DOCUMENTS

| | | |
|---|---|---|
| WO | WO2013162977 | 10/2013 |
| WO | WO2014033306 | 3/2014 |
| WO | WO2014113455 | 7/2014 |

OTHER PUBLICATIONS

"HMDs and Microdisplays Basics", Published on: Feb. 21, 2014 Available at: http://www.loreti.it/Download/PDF/SLM/HMDs20and20Microdisplays20Basics.pdf, 8 pages.

Kohno, et al., "Display Leakage and Transparent Wearable Displays: Investigation of Risk, Root Causes, and Defenses", In Technical Report MSR TR 2015 18, Feb. 2015, pp. 1-15.

Urey, et al., "Optics Designs and System MTF for Laser Scanning Displays", In Proceedings of SPIE The International Society for Optical Engineering, 13th Annual International Symposium on Aerospace/Defense Sensing Simulation and Controls, vol. 3689, Apr. 1999, 12 pages.

Watt, et al., "Achieving Near Correct Focus Cues in a 3-D Display using Multiple Image Planes", In Proceedings of SPIE 5666, Human Vision and Electronic Imaging X, Mar. 18, 2005, 9 pages.

"International Search Report and Written Opinion Issued in PCT Application No. PCT/US2016/062646", dated Feb. 3, 2017, 13 Pages.

"Second Written Opinion Issued in PCT Application No. PCT/US2016/062646", dated Nov. 27, 2017, 6 Pages.

* cited by examiner

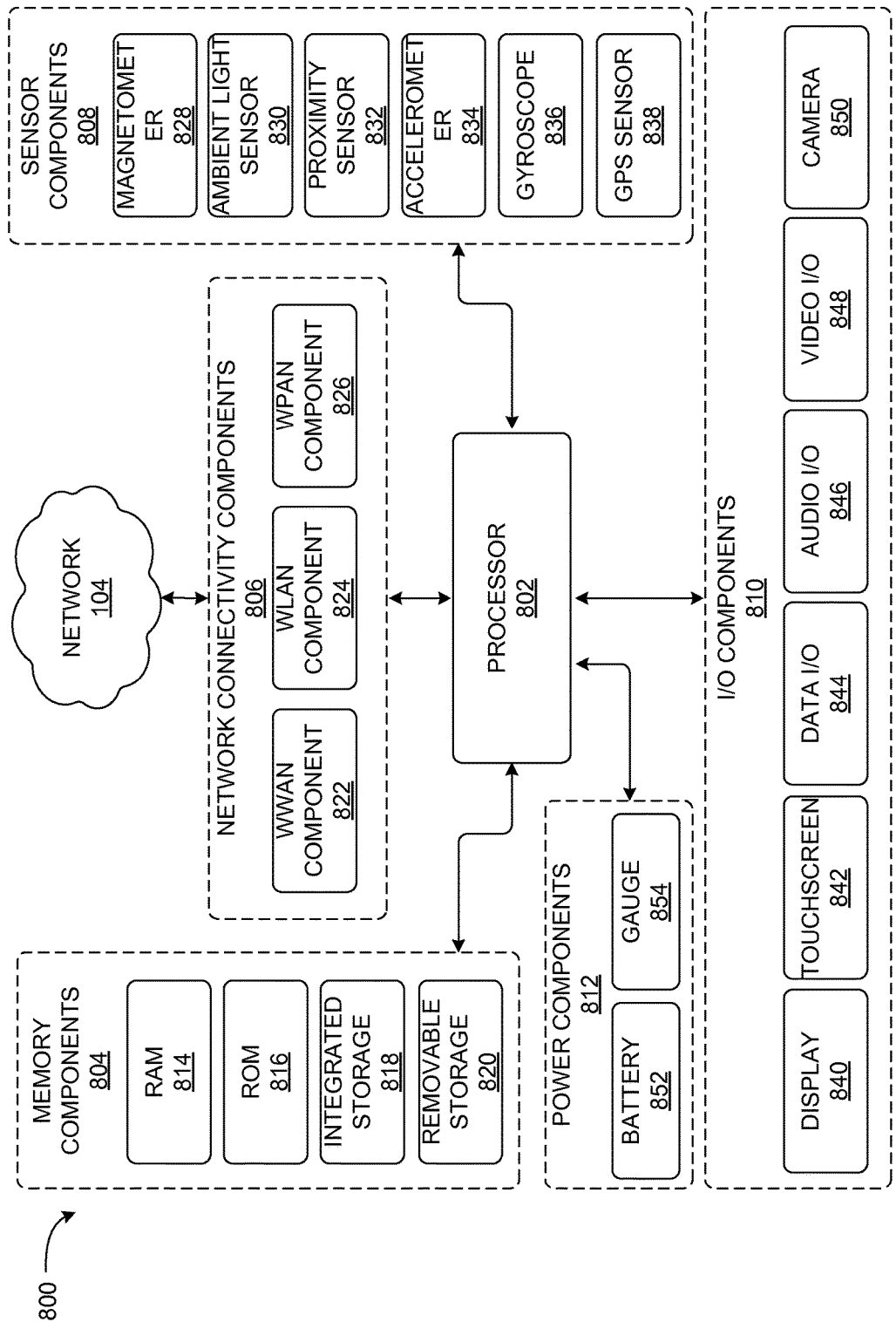

MULTI-OPTICAL SURFACE OPTICAL DESIGN

BACKGROUND

Mixed reality (MR) is a technology that merges real worlds and virtual worlds. MR is a technology that produces MR environments where a physical, real-world person and/or objects in physical, real-world scenes co-exist with a virtual, computer-generated person and/or objects in real time. For example, a MR display device can augment a physical, real-world scene with computer-generated graphics (e.g., a dog, a castle, etc.) and allow a user associated with the MR display device to view a composite view of the real world and computer-generated graphics.

MR display devices sometimes leverage varying focal depths of objects in a scene to generate depth perceptions like those that are experienced in the real world. Focal depths are ranges of distances in space that rays of light that appear to emerge from an object placed at given focal depth in a MR display appear with a sharpness above a threshold value if the user is focused at its apparent depth. Advanced MR display devices sometimes leverage light field displays and/or varifocal displays (e.g., focus changes as focal length changes) to achieve varying focal depths. Depth cues can supplement binocular cues received by both eyes, such as stereopsis, eye convergence, disparity, exploitation of parallax, etc., or monocular cues received by one eye, such as size, etc. However, light field displays and varifocal displays are expensive, power consumptive, and/or computationally intensive, and, in some examples, can cause reduced field of view and/or other degradations in performance.

SUMMARY

This disclosure describes a multi-optical surface optical design for generating multiple focal planes with identical image data that can be displayed at substantially the same time to generate the perception of varying focal depths, like those that are experienced in the real world. In at least one example, the technologies described can include a device comprising a plurality of reflective optical surfaces that can be arranged on top of one another and configured to generate multiple focal planes, an image source for projecting image data onto the plurality of reflective optical surfaces, the image data corresponding to an image that can include one or more virtual objects, and one or more computer storage media having computer-executable instructions that, when executed by one or more processors, configure the one or more processors to perform operations comprising rendering the image data in a focal plane of the multiple focal planes corresponding to a desired focal distance, wherein individual virtual objects of the one or more virtual objects are rendered with different degrees of sharpness based on a distance between the individual virtual objects and the desired focal plane, multiple copies of the image are caused to be perceived in other focal planes of the multiple focal planes at a substantially same time as the image data is rendered in the focal plane, and each copy of the multiple copies is presented with a perceived degree of sharpness such that each copy is out-of-focus.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figures in which the reference number first appears. The use of the same reference numbers in the same or different figures indicates similar or identical items or features.

FIG. 8 is a computer architecture diagram illustrating a computing device architecture for a computing device capable of implementing aspects of the techniques and technologies presented herein.

DETAILED DESCRIPTION

Figure 1:
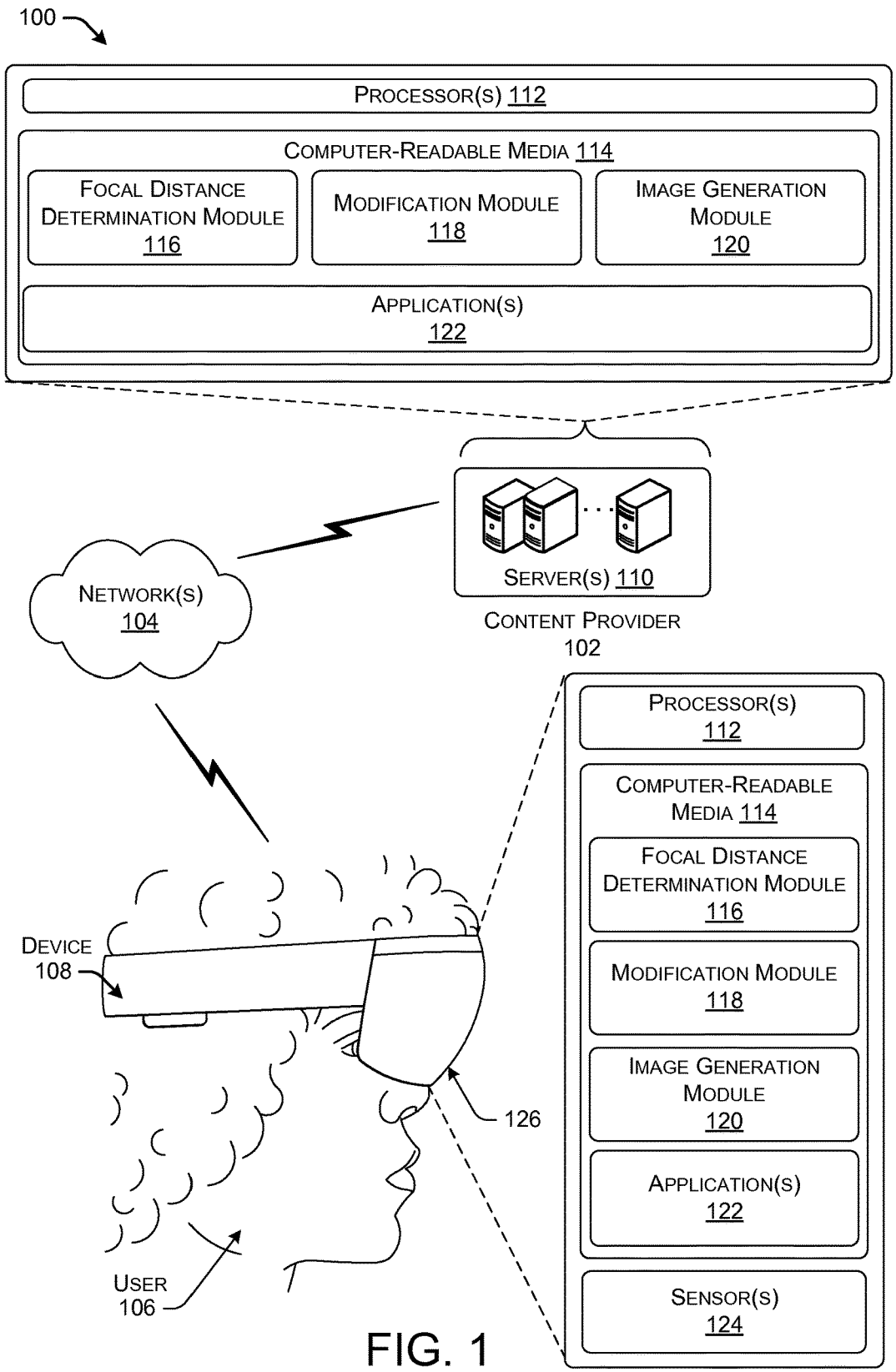
FIG. 1 is a schematic diagram showing an example environment including a near-eye display device for generating multiple focal planes with identical image data that can be displayed at substantially the same time via the near-eye display device to generate the perception of varying focal depths, like those that are experienced in the real world.

This disclosure describes technologies for generating multiple focal planes and causing identical image data to be presented in individual focal planes of the multiple focal planes at substantially the same time via a display device. In at least one example, the image data can correspond to an image including one or more virtual objects that can be rendered via a display of a device. That is, the technologies described herein can be used to render the image data corresponding to the image on a display and thereby cause multiple copies of the image to be perceived. The image and all of the copies of the image can be co-present via the display at substantially the same time. Each copy of the image can be positioned in an individual focal plane of the multiple focal planes. The image corresponding to the rendered image data can be rendered with a degree of sharpness such that the image appears sharp to the user and the multiple copies of the image can have perceived degrees of sharpness such that the image appears not sharp (e.g., blurry, out-of-focus, etc.). The multiple focal planes and/or different degrees of sharpness can generate the perception of varying focal depths, like those that are experienced in the real world. As described below, the near-eye display device can be a mixed reality (MR) display device and/or a virtual reality (VR) display device. While the disclosure herein describes MR display devices, the same and/or similar technologies can be applied for VR experiences.

As described above, the image data can correspond to an image including one or more virtual objects that can be rendered via a display of a MR display device. For the purposes of this discussion, physical, real-world objects ("real objects") or physical, real-world people ("real people" and/or "real person") describe objects or people, respectively, that physically exist in a physical, real-world scene ("real scene"). Real objects and/or real people can move in and out of a field of view based on movement patterns of the real objects and/or movement of a user and/or user device. Virtual, computer-generated content ("virtual content") can describe content that is generated by one or more computing devices to generate a virtual, computer-generated environment ("virtual environment," "VR environment," or "MR environment"). In at least one example, virtual content can include one or more pixels each having a respective color or brightness that are collectively presented on a display such as to represent a person, object, scene, etc. in the virtual environment. The one or more pixels can be output from the image source, described below in FIGS. 2-4. Virtual content can be rendered on a display of a VR device or MR device via techniques described herein.

Within an individual image, individual virtual objects can be rendered with different degrees of sharpness that can be determined based at least in part on the distance of each virtual object to an observing eye respective to a desired focal plane. The different degrees of sharpness can cause the virtual objects to appear sharp (e.g., in-focus) or some degree of not sharp (e.g., blurry, out-of-focus) that can be determined based at least in part on a position of each virtual object respective to a desired focal plane. That is, within the image that can be rendered sharp at the desired focal distance, individual virtual objects can have various degrees of sharpness. However, the copies of the image that appear at focal distances that are not the desired focal distance can have a perceived degree of sharpness whereby all virtual objects associated with the image appear not sharp (e.g., out-of-focus, blurry, etc.).

Technologies described herein include a multi-optical surface optical design for generating multiple focal planes with identical image data that can be displayed at substantially the same time to generate the perception of varying focal depths, like those that are experienced in the real world. In at least one example, the technologies described can include a device comprising a plurality of reflective optical surfaces that can be arranged on top of one another and configured to generate multiple focal planes, an image source for projecting image data onto the plurality of reflective optical surfaces and one or more computer storage media having computer-executable instructions that, when executed by one or more processors, configure the one or more processors to perform operations comprising rendering the image data in a focal plane of the multiple focal planes corresponding to a desired focal distance. The image data can correspond to an image and the image can include one or more virtual objects. Individual virtual objects of the one or more virtual objects can be rendered with different degrees of sharpness based on a distance between the individual virtual objects and the desired focal plane. The multiple copies of the image can be caused to be perceived in other focal planes of the multiple focal planes at a substantially same time as the image data is rendered in the focal plane and each copy of the multiple copies can be presented with a perceived degree of sharpness such that each copy appears to be out-of-focus.

That is, if an eye of an observer focuses at a given distance (e.g., the desired focal distance), then the image that is positioned or approximately positioned at the given distance is rendered sharply. Copies of the image at other distances can appear less sharply (e.g., blurry, out-of-focus, etc.) according to the distance of an individual copy of the image away from the distance the eye is focusing on (e.g., the desired focal distance). The eye can therefore see an in-focus copy of an image that is placed at the distance the eye is focusing on, but can see out of focus copies of the images that appear at substantially different distances. With respect to the in-focus copy of the image, individual virtual objects can be rendered with different degrees of sharpness based at least in part on the distance that a virtual object is positioned away from the distance the eye is focusing on (e.g., the desired focal distance). That is, individual virtual objects within the in-focus copy of the image can appear in-focus or out-of-focus.

The technologies described herein integrate a secondary surface mirror as a reflective optical surface to generate multiple optical surfaces that cause multiple focal planes with identical image data to be displayed at substantially the same time. For illustrative purposes, in at least one example such as in an on-axis optical system, a focal plane is a plane through a focal distance that is perpendicular to the axis of the reflective optical surface. Furthermore, in the at least one example, a focal distance is a distance in a space between a user's eye and a plane where an object (real or virtual) is in-focus. The multiple focal planes can create depth perceptions that are comparable to displays supporting variable focal cues and/or similar to those experienced in the real world. As a result, the technologies described herein can simulate light field displays and/or varifocal displays and can reduce expenditures in producing MR display devices, conserve power used by light field displays and/or varifocal displays, and reduce the consumption of computational resources consumed by light field displays and/or varifocal displays, or reduce the size and/or weight of the display.

FIG. 1 is a schematic diagram showing an example environment 100 including a near-eye display device for generating multiple focal planes with identical image data that can be displayed at a substantially same time via the near-eye display device to generate the perception of varying focal depths, like those that are experienced in the real world. More particularly, the example environment 100 can include a content provider 102, one or more networks 104, a user 106, and a device 108 associated with the user 106. This example is provided for illustrative purposes and is not to be construed as limiting. It can be appreciated that the example environment 100 can include any number of devices 108 and/or any number of content providers 102. Additional details associated with example environment 100 are described in FIGS. 6-8 below.

The content provider 102 can be any entity, server(s), platform, etc., that provides content for rendering computer-generated graphics (e.g., images including one or more virtual objects) in real-world scenes via MR display devices such as device 108. The content provider 102 can be implemented in a non-distributed computing environment or can be implemented in a distributed computing environment, possibly by running some modules on devices 108 or other remotely located devices. As shown, the content provider 102 can include one or more server(s) 110, which can include one or more processing unit(s) (e.g., processor(s) 112) and computer-readable media 114, such as memory.

The networks 104 can facilitate communication between the server(s) 110 and the device 108 associated with the user 106. In some examples, the networks 104 can be any type of network known in the art, such as the Internet. Moreover, the device 108 can communicatively couple to the networks 104 in any manner, such as by a global or local wired or wireless connection (e.g., local area network (LAN), intranet, etc.). In addition, the device 108 can communicate using any other technology such as BLUETOOTH, near field communication (NFC), or any other suitable light-based, wired, or wireless technology. It should be appreciated that many more types of connections can be utilized than illustrated in FIG. 1.

Examples support scenarios where device(s) that can be represented in the one or more server(s) 110 can include one or more computing devices that operate in a cluster or another clustered configuration to share resources, balance load, increase performance, provide fail-over support or redundancy, or for other purposes. Device(s) that can be represented in the one or more server(s) 110 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device. Device(s) that can be represented in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip Systems (SOCs), Complex Programmable Logic Devices (CPLDs), etc. The one or more server(s) 110, which can be associated with different content providers 102, can also include components, such as the components shown in FIG. 8, for executing one or more aspects of the techniques described herein.

Processing unit(s) (e.g., processor(s) 112) can represent, for example, a CPU-type processing unit, a GPU-type processing unit, a Field-programmable Gate Array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip Systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems. Additional details associated with the processing unit(s) are described in FIG. 8 below.

In at least one configuration, the computer-readable media 114 of the server(s) 110 can include components that facilitate rendering computer-generated graphics (e.g., images including one or more virtual objects) in real-world scenes via MR display devices such as device 108. The components can represent pieces of code executing on a computing device. For example, the computer-readable media 114 can include a focal distance determination module 116, a modification module 118, an image generation module 120, application(s) 122, etc. In at least some examples, the modules (116, 118, 120, etc.) can be implemented as computer-readable instructions, various data structures, and so forth via at least one processing unit(s) (e.g., processor(s) 112) to configure a device to execute instructions and to render computer-generated graphics in real-world scenes via MR display devices, such as device 108. Functionality to perform these operations can be included in multiple devices or a single device. Additional details associated with the computer-readable media 114 are provided below in FIG. 6.

The focal distance determination module 116 can determine the focal distance that a user 106 (e.g., the eyes and brain of the user) expects at any point in time. For the purpose of this discussion, the focal distance that a user 106 expects is called a desired focal distance. In some examples, the focal distance determination module 116 can determine the desired focal distance based at least in part on accessing, receiving, and/or determining data from one or more sensors 124, including but not limited to cameras, gaze tracking devices, etc. In at least one example, the one or more sensors 124 can be associated with device 108, described below.

For instance, in at least one example, the focal distance determination module 116 can determine the desired focal distance based at least in part on accessing, receiving, and/or determining data indicating a measurement of the shape of the lenses of each eye of the user 106. In such examples, the focal distance determination module 116 can communicatively couple to one or more sensors 124 that can look at the user's 106 eyes and determine the shape of the lenses of each eye. The one or more sensors 124 can send data associated with the measurement of the shape of the lenses of each eye to the focal distance determination module 116 and the focal distance determination module 116 can determine the desired focal distance of each eye.

In other examples, the focal distance determination module 116 can access, receive, and/or determine data associated with the degree to which a user's 106 eyes rotate towards each other at a given time (i.e., vergence) to estimate the distance that the brain thinks the eyes should be focused. In at least one example, the focal distance determination module 116 can communicatively couple with one or sensors 124 that can track the movement of each eye in two dimensions to determine the vergence at a given time. In other examples, one or more sensors 124 can determine vergence based at least in part on tracking gaze in one dimension instead of two dimensions. The focal distance determination module 116 can leverage data associated with vergence received from the one or more sensors 124 to determine the desired focal distance of each eye.

In additional and/or alternative examples, the focal distance determination module 116 can determine the desired focal distance based at least in part on leveraging heuristics to estimate the desired focal distance. In such examples, the focal distance determination module 116 may not have access to sensors. Or, the focal distance determination module 116 can leverage the heuristics to supplement the measurement of the shape of the lenses of each eye and/or the vergence.

As a non-limiting example, the focal distance determination module 116 can determine that a user 106 is interacting with a real object or virtual object and can consequently estimate that the user 106 is focused on the focal distance associated with the real object or a virtual object. As an additional non-limiting example, the focal distance determination module 116 can determine a position of a user's 106 head and can draw a vector from the position of the user's 106 head, in a forward direction, until the vector intersects with a real object or virtual object. If the vector does not intersect a real object or a virtual object until it intersects with the floor, the focal distance determination module 116 can estimate that the user is 106 focused on the focal distance associated with the floor. Or, if the vector does not intersect a real object or a virtual object until it intersects with a wall, the focal distance determination module 116 can estimate that the user 106 is focused on the focal distance associated with the wall.

In yet another non-limiting example, the focal distance determination module 116 can determine whether real objects or virtual objects are in front of a user's 106 face and can estimate that the user 106 is focused on a focal distance associated with one of the real objects or the virtual objects. In an additional non-limiting example, the focal distance determination module 116 can determine that a user 106 turns his or her head in a direction of a real object or a virtual object and can estimate that the user 106 is focused on a focal distance associated with the real object or the virtual object that is in the direction that the focal distance determination module 116 determined that the user 106 turned his or her head. In some examples, the focal distance determination module 116 can determine a direction that a user 106 turns his or her head based at least in part on communication with sensors and/or tracking devices.

The modification module 118 can make corrections to differences in position, scale, brightness, contrast, and other aspects of the multiple focal planes so that they appear more consistent. That is, the modification module 118 can send and/or otherwise provide data to the image generation module 120 that includes instructions for adjusting the position, scale, brightness, contrast, and/or other aspects of the multiple focal planes. In at least one example, the modification module 118 can send data and/or otherwise provide data to the image generation module 120 to make adjustments to the viewing frustum to correct for errors with respect to the position and the magnification of the image rendered in the desired focal plane. That is, in the at least one example, the modification module 118 can cause a translation to the position of the image and/or cause different angular magnifications for the different focal planes.

The image generation module 120 can generate an image for rendering by an image source, described below. The image can include one or more virtual objects. In some examples, the image source can render the image on a graphical user interface (GUI) on a display surface 126 of a MR display device. In at least one example, the display surface 126 can be a reflective optical surface, as described below. The image generation module 120 can access and/or receive data from the focal distance determination module 116, the modification module 118, and/or application(s) 122, described below, and can send image data to the image source for rendering the image on the GUI. In some examples, the image generation module 120 can generate an image and can send corresponding image data to the image source to render the image on the GUI utilizing rasterization, ray casting, and/or additional rendering technologies. In at least one example, the data accessed and/or received from the focal distance determination module 116 can be data indicating the desired focal distance.

In at least one example, the image generation module 120 can leverage the data accessed and/or received from the focal distance determination module 116 to determine a degree of sharpness for rendering individual virtual objects in an image. That is, the image generation module 120 can cause virtual objects that are positioned in the focal plane corresponding to the desired focal distance to be rendered with a degree of sharpness such that the virtual object appears sharp to the user 106. In such examples, the degree of sharpness associated with a virtual object that appears sharp can be a degree of sharpness above a threshold level. The threshold level can be associated with a sharpness rating, for example, based on point spread function, at which an object appears unblurred (e.g., in-focus) to a human eye. For the purpose of this discussion, the focal plane corresponding to the desired focal distance is called the desired focal plane. The point spread function can be estimated based at least in part on the user's 106 pupil size, the focal distance of the user 106, and the distance of the virtual object. Moreover, the image generation module 120 can cause virtual objects that are positioned in a focal plane that is not the desired focal plane to be rendered with a degree of sharpness such that the virtual object is not sharp. That is, the image generation module 120 can cause virtual objects that are positioned in a focal plane that is not the desired focal plane to be rendered with a degree of sharpness such that the virtual object appears blurry (e.g., out-of-focus) to the user 106. The image generation module 120 can cause a virtual object to be rendered with different degrees of sharpness based at least in part on modifying the intensity of light rays emitted from an image source.

The degree of sharpness can change depending on a determined distance that a virtual object is away from the desired focal plane. In at least one example, a virtual object that is positioned within a first threshold distance of the desired focal plane can be rendered with a degree of sharpness such that the point spread function value is greater than a point spread function value associated with the virtual object rendered at the desired focal plane. And, a virtual object positioned a second threshold distance away from the desired focal plane that is farther away from desired focal plane than the first threshold distance can have a point spread function value that is greater than the point spread function value associated with virtual object that is positioned within the first threshold distance of the desired focal plane. For instance, a virtual object that is positioned within a first threshold distance of the desired focal plane can be rendered with a degree of sharpness such that the virtual object is less sharp (and more blurry) than a virtual object positioned in the desired focal plane, but more sharp (and less blurry) than a virtual object that is positioned a second threshold distance away from the desired focal plane that is farther away from desired focal plane than the first threshold distance. That is, the closer a virtual object is to the desired focal plane, the more sharp (and less blurry) the virtual object appears and the farther a virtual object is away from the desired focal plane, the less sharp (and more blurry) the virtual object appears.

With respect to an individual image including one or more virtual objects, the image generation module 120 can access and/or receive data from the focal distance determination module 116, the modification module 118, and/or application(s) 122, described below, and can send image data to the image source for rendering on the GUI. As described above, in at least one example, the data accessed and/or received from the focal distance determination module 116 can be data indicating the desired focal distance. The image generation module 120 can leverage the data accessed and/or received from the focal distance determination module 116 to cause an image positioned at the desired focal distance to be rendered with a degree of sharpness such that the image is sharp. In such examples, the degree of sharpness associated with an image that appears sharp can be a degree of sharpness above a threshold level. The threshold level can be associated with a sharpness rating, for example, based on point spread function, at which an object (e.g., image) appears unblurred (e.g., in-focus) to a human eye. Based at least in part on the image source rendering the image in the desired focal plane, the image can be optically duplicated via the optical reflective surfaces described herein to cause one or more copies of the image to be perceived. The one or more copies of the image can appear in focal planes that are not the desired focal plane with a perceived degree of sharpness such that the one or more copies of the image are not sharp. That is, the one or more copies of the image can appear blurry (e.g., out-of-focus) to the user 106.

Based at least in part on the varying degrees of sharpness and/or varying perceived degrees of sharpness described herein, when a user 106 focuses on an image at the desired focal distance (e.g., positioned in the desired focal plane), the user 106 can see a sharp image and all other copies of the image that are positioned at a focal distance that is not the desired focal distance can appear blurry. In some examples, the light rays associated with the out-of-focus copies of the image can cause an aura, such as a bokeh effect and/or halo effect, to be perceived around the image that is positioned at the desired focal distance (i.e., the sharp image).

In at least one example, the degree of sharpness can be determined based at least in part on data associated with the brightness of a real scene or virtual scene. In the real world, the degree in which objects go out-of-focus is based on a brightness associated with the real scene. That is, objects go out-of-focus faster when the real scene has a brightness above a threshold and objects go out-of-focus slower when the real scene has a brightness below a threshold. In some examples, the image generation module 120, or a module, component, and/or device (e.g., sensor, etc.) communicatively coupled to the image generation module 120, can estimate a brightness of a physical scene and the image generation module 120 can leverage data associated with the estimated brightness of the physical scene to determine degrees of sharpness associated with the copies of the image that are positioned at focal distances that are not the desired focal distance.

Applications (e.g., application(s) 122) are created by programmers to fulfill specific tasks. For example, applications (e.g., application(s) 122) can provide utility, entertainment, and/or productivity functionalities to users 106 of devices 108. Applications (e.g., application(s) 122) can be built into a device (e.g., telecommunication, text message, clock, camera, etc.) or can be customized (e.g., games, news, transportation schedules, online shopping, etc.). Additional details associated with the application(s) 122 are described below in FIG. 7.

In some examples, the user 106 can operate a corresponding device 108 (e.g., user device 108) to perform various functions associated with the device 108. Devices, such as device 108, can represent a diverse variety of device types and are not limited to any particular type of device. Examples can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

In at least one example, the devices 108 can include MR display devices (e.g., CANON® MREAL® System, MICROSOFT® HOLOLENS®, etc.). MR display devices can include one or more sensors 124 and a MR display, as described below in the context of FIGS. 2-4. In FIG. 1, device 108 is illustrated as a near-eye display device. Near-eye display devices can create a display in front of a user's 106 field of vision, such as a head-mounted display device as shown in FIG. 1, a hand-held device configured to be held close to a user's 106 eye, a helmet with a visor that acts as a display, etc. Near-eye display devices can have transparent display surfaces 126, whereby virtual content can be rendered in real scenes seen through the near-eye display device display, such as in MR experiences. Alternatively, near-eye display devices can have opaque display surfaces 126, whereby a user 106 is fully immersed in a virtual environment, such as in VR experiences. Additionally and/or alternatively, the technologies described herein, can also be used in other near-eye display devices such as lens based near-eye imaging display devices, off-axis based near-eye imaging display devices, freeform based near-eye imaging display devices, etc. Additionally and/or alternatively, the technologies described herein can be applied to displays that are larger than displays in near-eye display devices that are intended for on-axis viewing at other distances. Additional details about device 108 are described below in FIGS. 6-8.

Figure 2:
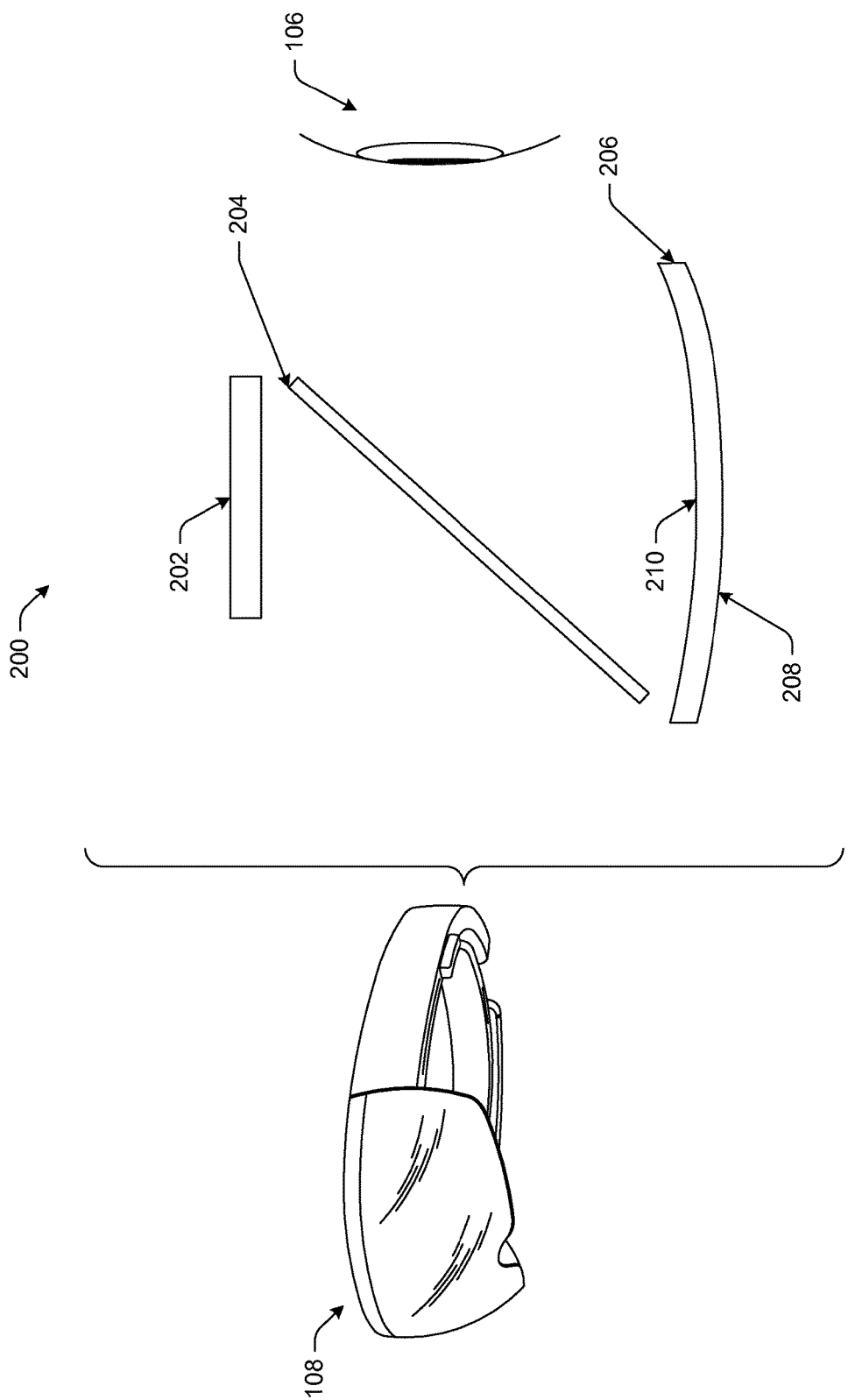
FIG. 2 is a schematic diagram showing an example optical system for a near-eye display device.
Figure 3:
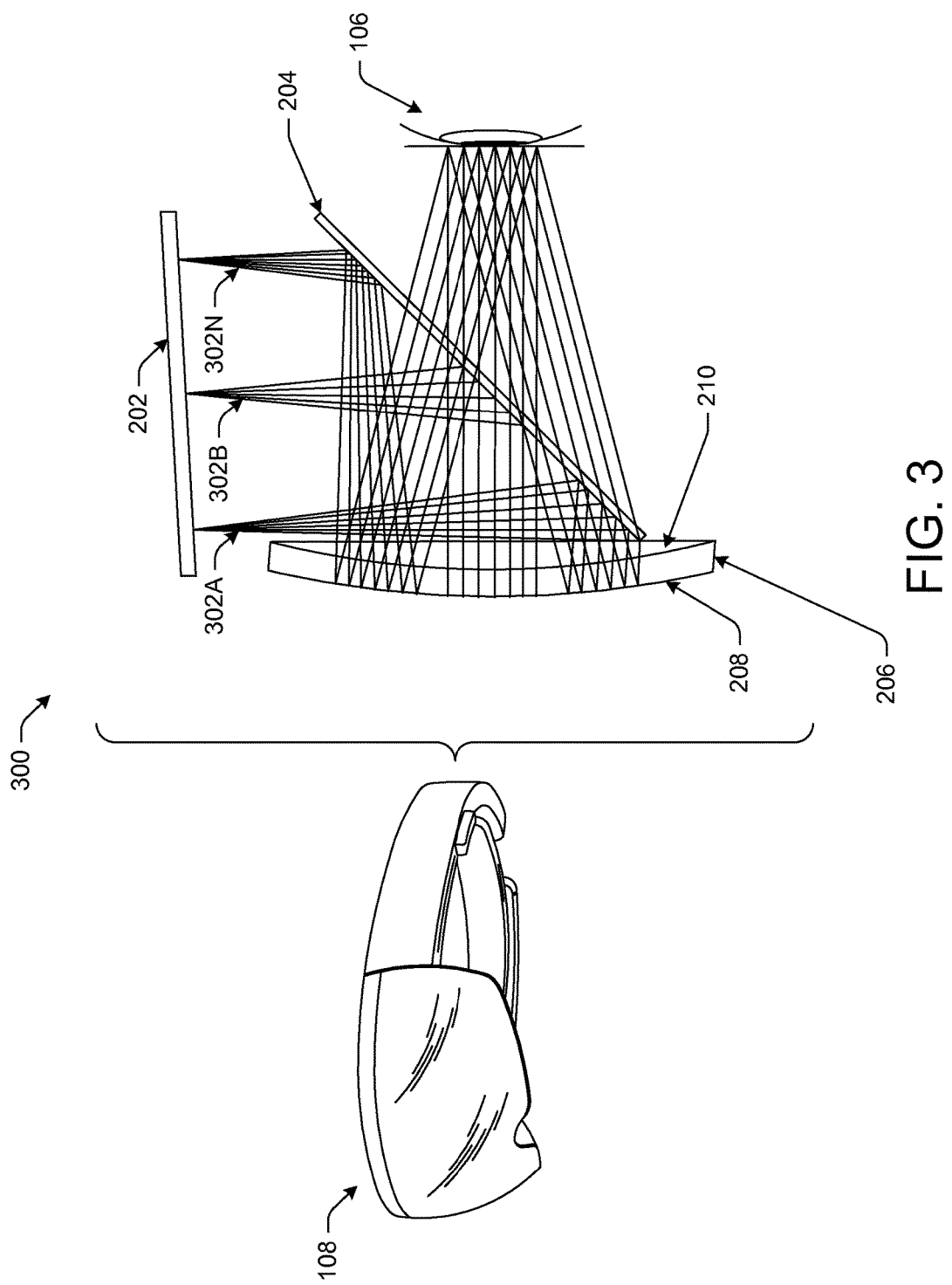
FIG. 3 is a schematic diagram showing another example optical system for a near-eye display device.
Figure 4:
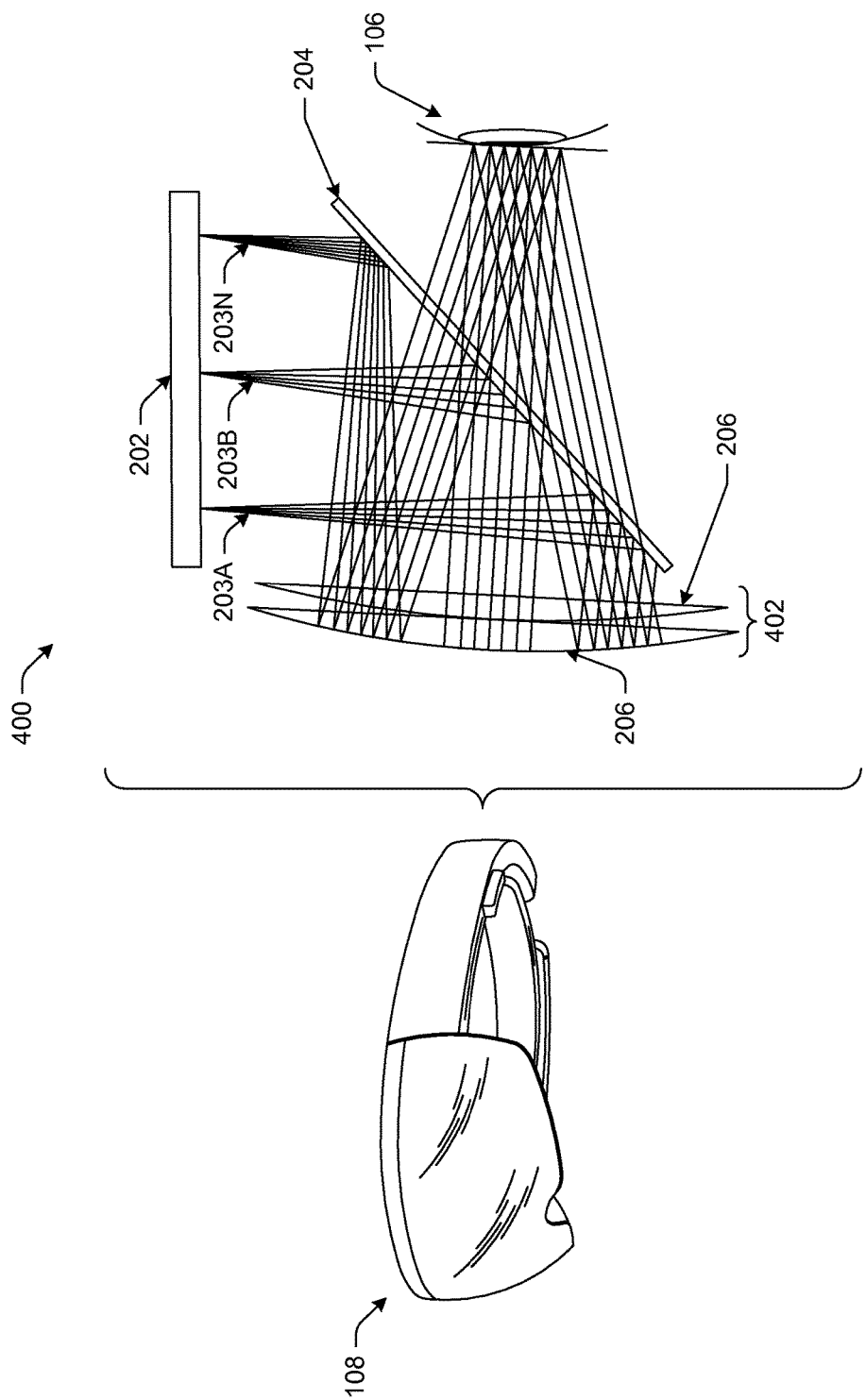
FIG. 4 is a schematic diagram showing yet another example optical system for a near-eye display device.

FIGS. 2-4 are schematic diagrams showing example optical systems 200, 300, and 400, respectively, for a head-mounted MR display device, such as device 108. FIGS. 2-4 illustrate examples of birdbath near-eye display devices. A birdbath near-eye display device is a device in which a beam splitter is used with an on-axis reflector to focus an image from an image producing device (e.g., image source 202).

In FIG. 2, the optical system 200 comprises an image source 202 configured to produce an image including one or more virtual objects for display via the MR display device 108. That is, the image source 202 can provide image content (e.g., one or more frames of image data) in a time sequential manner. The image source 202 can have any suitable location relative to other optical components. For instance, in some examples, the image source 202 can be disposed at a top side of the MR display device 108 from a perspective of a user 106, as illustrated in FIGS. 2-4. The image source 202 can comprise any suitable type of image producing device. For example, the image source 202 can comprise an emissive microdisplay, such as an OLED (Organic Light Emitting Device) display, and/or a reflective microdisplay, such as an LCoS (Liquid Crystal on Silicon) display or digital light processing (DLP) device. In some examples, a separate microdisplay can be utilized for each color of light displayed, while in other examples, a single microdisplay can be utilized (e.g., by displaying a color field sequential image or interleaved color mosaic). In additional and/or alternative examples, separate image sources can be utilized for the left and right eyes of a user 106. This can facilitate the display of stereoscopic images. In such an example, separate optical systems (e.g., optical system 200, 300, 400), or one or more separate components thereof, can be used to produce left-eye and right-eye images.

FIGS. 3 and 4 illustrate paths of reflection through corresponding optical systems 300 and 400, respectively. More specifically, FIGS. 3 and 4 show a number of light rays 302A, 302B, and/or 302N (collectively, 302) representing an arbitrary number of light rays originating from an arbitrary set of initial locations on the image source 202. In at least one example, each initial location on the image source 202 can represent a pixel on the image source 202. The light can reflect off of a beam splitter 204.

In at least one example, the optical system 200 can include at least one beam splitter 204. A beam splitter 204 is an optical device that splits a beam of light in to two or more beams of light. The resulting two or more beams of light can have different intensities, polarizations, or wavelength ranges. In some examples, a beam splitter 204 can be a prism, formed from any suitable material including but not limited to glass materials, polymer materials, etc. In additional and/or alternative examples, a mirror can be used as a beam splitter 204. For instance, a half-silvered mirror, which can be formed from a sheet of glass material or plastic substrate material with a thin coating of metal (e.g., aluminum, etc.), dichroic optical coating, etc., can be used as a beam splitter (e.g., beam splitter 204). Additionally and/or alternatively, a dichroic mirrored prism assembly which uses dichroic optical coatings to divide an incoming beam of light into a number of spectrally distinct output beams can be used as a beam splitter 204.

The beam splitters 204 described above and additional and/or alternative mechanisms can be used to split a beam of light in to two or more beams of light. In at least one example, a beam splitter 204 can be used to split a light beam into two or more beams such that the intensity may vary between beams, as described herein. For instance, a prism can reflect light from an image source 202 to a reflective optical surface 206 and/or combiner, described below. In some examples, the reflection can be caused by an internal reflection. In other examples, a reflective coating can be used. In another example, a beam splitter 204 can be used to split light based on polarization. For instance, a mirror that reflects polarized light of a first polarization and transmits polarized light of a second polarization can be used for splitting light via polarization. In such examples, the second polarization can be orthogonal to the first polarization. Furthermore, in such examples, the mirror can appear transparent to the outside world, either by using additional polarizers or by using a mirror that reflects narrow wavelengths of light.

In additional and/or alternative examples, a beam splitter 204 can split light based on wavelengths. For instance, in at least one such example, a first image source (e.g., image source 202) can reflect a first set of RGB light at a first wavelength off of a first surface of a beam splitter 204 and a second, distinct image source can reflect a second set of RGB light at a second wavelength off of a second, opposite surface of the beam splitter 204. In other examples, light can be split based on time sequence and/or spatial distance. For instance, a device such as a LCD shutter, switchable mirror, etc. can be used to actively change the reflectivity of the surface of a beam splitter 204 to split light based on time sequence. Or, a polka-dot reflective surface can be associated with a beam splitter 204 to enable a portion of light through the beam splitter 204 to split light based on spatial distance.

The optical system 200 can include at least one reflective optical surface 206. As described above, in at least one example, the at least one reflective optical surface 206 can be the display surface 206. A reflective optical surface 206 can include a mirror, which alters the way in which an optical system (e.g., 200, 300, 400, etc.) reflects and transmits light. In some examples, an optical surface, including but not limited to a glass surface, a plastic substrate surface, etc., can be coated with one or more reflective materials to create a reflective optical surface 206, such as a mirror. The one or more reflective materials can include thin layers of metals such as aluminum, silver, chrome, gold, etc., dielectric coating such as magnesium fluoride, calcium fluoride, etc., etc. The metal and/or dielectric coatings used for coating the optical surface can determine reflection characteristics of the mirror.

In at least one example, the reflective optical surface 206 can be a secondary surface mirror. For illustrative purposes, a secondary surface mirror is an optical surface where the back of the optical surface is coated with the one or more reflective materials. That is, a secondary surface mirror is a reflective optical surface 206 where the reflective coating is protected by the optical surface. The front of the optical surface can be at least partially reflective. In examples where the reflective optical surface 206 is a secondary surface mirror, both the front of the optical surface and the reflective surface on the back of the optical surface can reflect light. That is, in examples where the reflective optical surface 206 is a secondary surface mirror, the optical surface can provide a first adjustment to a virtual object and the reflective surface on the back of the optical surface can provide a second adjustment to the virtual object. For instance, in at least one example, the reflective optical surface 206 can generate three or more focal planes and one of the focal planes can be generated based on image data that is reflected off of a front surface of the optical surface at least twice. In additional and/or alternative examples, the reflective optical surface 206 can be a planar optic that can reflect light off of a first surface and a second, opposite surface.

The reflective optical surface 206 can have any suitable configuration. In at least one example, the reflective optical surface 206 can have a cylindrical profile along one or more axes, a spherical curvature, etc. In such examples, the reflective optical surface 206 can have a front curvature 208 and a back curvature 210. Based at least in part on adjusting spacing between the front curvature 208 and back curvature 210, and, in some examples, a power of the curvatures, a focus distance of near and far focal planes can be controlled. Additionally, the reflective optical surface 206 can have any suitable structure to enable the reflection of light from the image source 202 and the transmission of background light. For example, the reflective optical surface 206 can comprise a partially transmissive mirror, a reflective polarizer, a diffractive optical element (e.g., a hologram configured to reflect light in narrow wavelength bands corresponding to bands utilized in producing displayed images), a dielectric mirror, and/or any other partially reflective/partially transmissive structure.

In at least one example, the reflective optical surface 206 can cause two focal planes, resembling a wide depth of field in which an image is almost always in-focus, no matter the focus of a user's 106 eyes. Depth of field is the distance between the nearest and farthest objects in a scene that have a degree of sharpness above a threshold. One or more additional reflective optical surfaces 206 can be combined into a stack of reflective optical surfaces 402 (e.g., individual reflective optical surfaces 206 arranged on top of one another) to cause copies of an image to be perceived at multiple focal depths, as illustrated in FIG. 4. As additional reflective optical surfaces 206 are added to the optical system (e.g., optical system 200, 300, 400), the additional reflective optical surfaces 206 can cause additional focal planes, resembling a more accurate depth of field. The image source 202 can render an image in the desired focal plane and copies of the image can appear in individual focal planes that are various distances away from the desired focal plane at a substantially same time. As described above, individual copies of the image can have different degrees of perceived sharpness that are determined based at least in part on the distance an individual copy of the individual copies is positioned away from the desired focal plane. As a user's 106 eyes focus on one focal plane or another, an image can appear to come in and out-of-focus. In some examples, the image can be surrounded by an aura of out-of-focus light rays that can cause an added glow around the image. The aura can be similar to a bokeh or halo effect that can be observed in photography, gaming, etc.

The reflective optical surface 206 can have any suitable location relative to other optical components. For instance, as illustrated in FIG. 2, the reflective optical surface 206 can be placed at a bottom side of the MR display device 108 from a perspective of a user 106. In other examples, as illustrated in FIGS. 3 and 4, the reflective optical surface 206 is positioned in-line with the eye of a user 106. In such examples, the reflective optical surface 206 can also be a combiner. A combiner allows two or more optical paths to be superimposed into substantially the same optical path (e.g., the see-through and virtual image optical paths). In examples where the reflective optical surface 206 is positioned in-line with the eye of the user 106, the one or more reflective optical surfaces 206 can be optically flat by being thin or by compensating for each other's distortions to prevent distorting the real world. Similarly, the stack of reflective optical surfaces 402 can have any suitable location relative to other optical components. For instance, a stack of reflective optical surfaces 402 can be placed at a bottom side of the MR display device 108 from a perspective of a user 106, as illustrated in FIG. 2. In other examples, as illustrated in FIG. 4, the stack of reflective optical surfaces 402 can be placed in-line with the eye.

Additional and/or alternative configurations can cause copies of an image to be perceived at multiple focal planes. For instance, in at least one example, the one or more additional reflective optical surfaces 206 can be placed over the image source 202. For instance, in such examples, two partially silvered planar mirrors can be placed over the image source 202 to create an "infinity mirror" in which a new copy of a virtual object can appear at a greater depth with each bounce. The depths can be expanded with a single focusing mirror.

In additional and/or alternative examples, the one or more additional reflective optical surfaces 206 can be associated with the beam splitter 204. For instance, the beam splitter 204 can include two beam splitters separated by a small distance which can generate additional focal planes. Moreover, in another alternative example, one or more additional reflective optical surfaces 206 can be positioned between the image source 202 and the eye of the user 106. For instance, two partially silvered planar mirrors can be placed in front of an eye of a user 106 to generate additional focal planes.

In some examples, the individual reflective optical surfaces 206 in the stack of reflective optical surfaces 402 can be oriented to reflect off of each other multiple times, creating multiple focal planes. In each example, the number and position of the focal planes (e.g., the focal accuracy) can be balanced with the interference between the simultaneously in-focus and out-of-focus planes (e.g., the image quality and contrast). Outside of the context of birdbath displays, described herein, stacks of reflective optical surfaces 402 can be integrated into other optical systems such as off-axis optical systems, etc. to add an adjustable focus capability.

As described above, technologies described herein can be used for generating multiple focal planes at substantially the same time. The multiple focal planes can generate the perception of varying focal depths, like those that are experienced in the real world. Additional and/or alternative technologies can also be utilized for generating multiple focal planes at substantially the same time. For instance, in at least one example, based at last in part on splitting light based on polarization, as described above, two images can be generated, each image having a different polarization (e.g., one image has a polarization that is orthogonal to the other). In such examples, a user 106 can switch between images such that both images are not visible at a substantially same time, but at complimentary times, to generate depth perceptions that are similar to conventional three-dimensional displays. Alternatively, technologies can include a lenticular lens (e.g., an array of magnifying lenses that are designed so that when viewed from slightly different angles different images can be magnified). Additionally, a diffractive element (e.g., a grating, diffractive optical element, or hologram) can be placed on one of more of the optical surfaces such that the multiple orders of the diffractive element form multiple focal planes. For example, a weak diffractive element placed on a curved reflective element can cause the light reflected off each point of the reflective surface to be diffracted to slightly different angles (corresponding to each of the diffractive orders), each of which can cause an image to be focused to a different focal plane. Alternatively, all of the focusing power of the system could be diffractive. For example, a volume hologram can be constructed to act as as a lens that images a point to multiple focal planes at substantially the same time.

Figure 5:
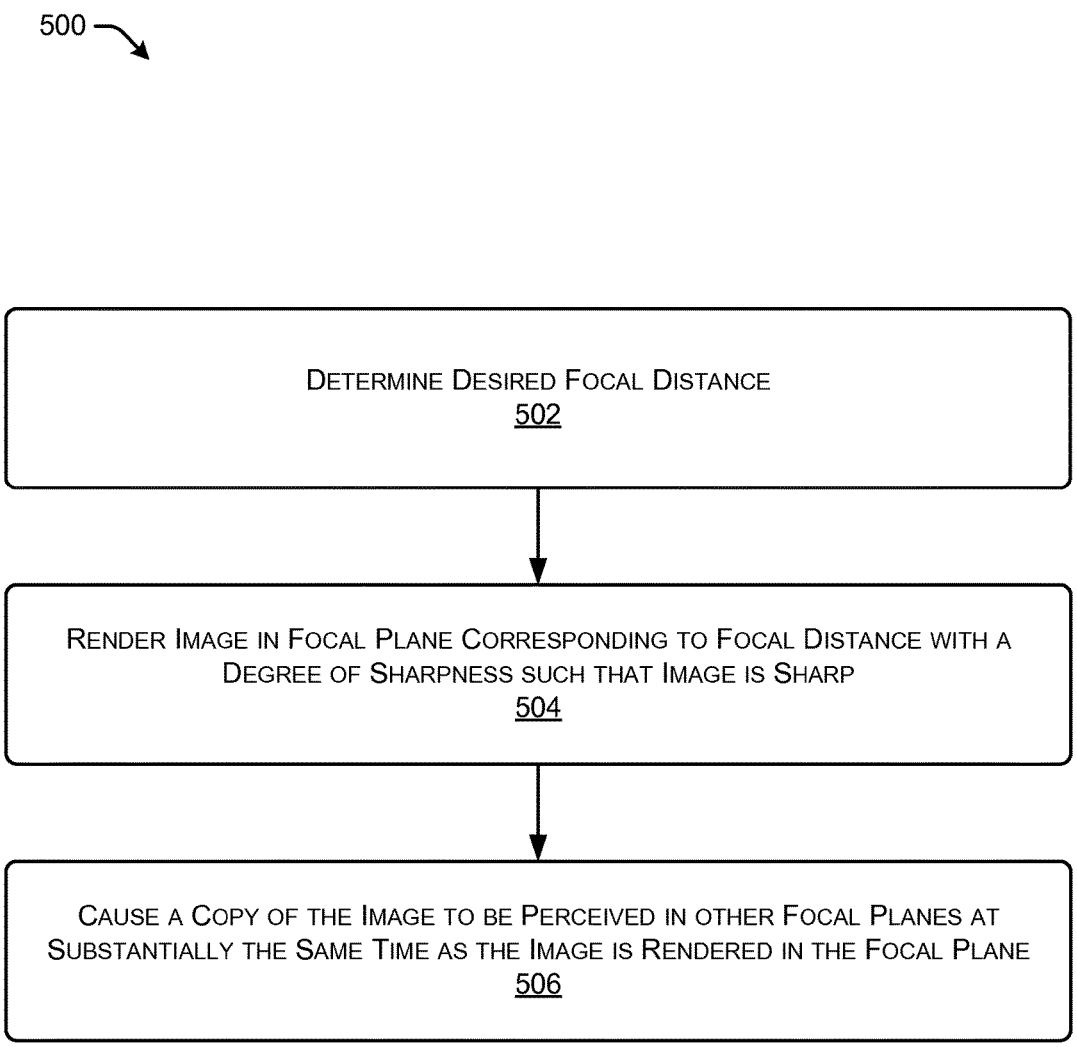
FIG. 5 is a flow diagram that illustrates an example process to determine a desired focal distance and render an image with a degree of sharpness determined based at least in part on the desired focal distance.

FIG. 5 is a flow diagram that illustrates an example process 500 to determine a desired focal distance and render a virtual object with a degree of sharpness determined based at least in part on the desired focal distance.

Block 502 illustrates determining a desired focal distance. The focal distance determination module 116 can determine the focal distance that a user 106 (e.g., the eyes and brain of the user) expects at any point of time. In some examples, the focal distance determination module 116 can determine the desired focal distance based at least in part on accessing, receiving, and/or determining data from one or more sensors 124, including but not limited to, cameras, gaze tracking devices, etc. For instance, in at least one example, the focal distance determination module 116 can determine the desired focal distance based at least in part on accessing, receiving, and/or determining data indicating a measurement of the shape of the lenses of each eye of the user 106, as described above. In other examples, the focal distance determination module 116 can access, receive, and/or determine data associated with the degree to which a user's 106 eyes rotate towards each other at a given time (i.e., vergence) to estimate the distance that the brain thinks the eyes should be focused, as described above. In additional and/or alternative examples, the focal distance determination module 116 can determine the desired focal distance based at least in part on leveraging heuristics to estimate the desired focal distance, as described above.

Block 504 illustrates rendering an image in a focal plane corresponding to the desired focal distance (i.e., the desired focal plane) with a degree of sharpness such that the image is sharp. As described above, with respect to an individual image including one or more virtual objects, the image generation module 120 can access and/or receive data from the focal distance determination module 116, the modification module 118, and/or application(s) 122, described below, and send image data to the image source 202 for rendering the image on the GUI. As described above, in at least one example, the data accessed and/or received from the focal distance determination module 116 can be data indicating the desired focal distance. In at least some examples, as described above, the modification module 118 can send and/or otherwise provide data to the image generation module 120 that includes instructions for adjusting the position, scale, brightness, contrast, and/or other aspects of the multiple focal planes. In some examples, the image generation module 120 can generate an image and can send corresponding image data to the image source 202 to render the image on the GUI utilizing rasterization, ray casting, and/or additional rendering technologies.

The image generation module 120 can leverage the data accessed and/or received from the focal distance determination module 116 and/or the modification module 118 to cause an image positioned at the desired focal distance to be rendered with a degree of sharpness such that the image is sharp. In such examples, the degree of sharpness associated with an image that appears sharp can be a degree of sharpness above a threshold level. The threshold level can be associated with a sharpness rating, for example, based on point spread function, at which an object (e.g., image) appears unblurred (e.g., in-focus) to a human eye. Based at least in part on the image source 202 rendering the image in the desired focal plane, the image can be optically duplicated via the optical reflective surfaces described herein to cause one or more copies of the image to be presented. Block 506 illustrates causing a copy of the image to be perceived in other focal planes at substantially the same time as the image is rendered in the desired focal plane. The one or more copies of the image can appear in focal planes that are not the desired focal plane with a perceived degree of sharpness such that the one or more copies of the image are not sharp. That is, the one or more copies of the image can appear blurry (e.g., out-of-focus) to the user 106.

Based at least in part on the varying degrees of sharpness and/or varying perceived degrees of sharpness described herein, when a user 106 focuses on an image at the desired focal distance (e.g., positioned in the desired focal plane), the user 106 can see a sharp image and all other copies of the image that are positioned at a focal distance that is not the desired focal distance can appear blurry. In some examples, the light rays associated with the out-of-focus copies of the image can cause an aura, such as a bokeh effect and/or halo effect, to be perceived around the image that is positioned at the desired focal distance (i.e., the sharp image).

As described above, the image generation module 120 can generate an image with one or more virtual objects for rendering on a graphical user interface (GUI) on the display surface 126 of the MR display device. The image generation module 120 can leverage the data accessed and/or received from the focal distance determination module 116 to determine a degree of sharpness for rendering individual virtual objects in the image. That is, the image generation module 120 can send image data associated with an image to an image source 202 for rending virtual objects that are positioned in the focal plane corresponding to the desired focal distance with a degree of sharpness such that the virtual object appears sharp to the user 106. In such examples, the degree of sharpness associated with a virtual object that appears sharp can be a degree of sharpness above a threshold level. The threshold level can be associated with a sharpness rating, for example, based on point spread function, at which an object appears unblurred (e.g., in-focus) to a human eye. Moreover, the image generation module 120 can cause virtual objects that are positioned in a focal plane that is not the desired focal plane to be rendered with a degree of sharpness such that the virtual object is not sharp. That is, the image source 202 can render virtual objects that are positioned in a focal plane that is not the desired focal plane with a degree of sharpness such that the virtual object appears blurry (e.g., out-of-focus) to the user 106. The image generation module 120 can cause a virtual object to be rendered with different degrees of sharpness based at least in part on causing modifications to the intensity of light rays emitted from the image source 202.

Figure 6:
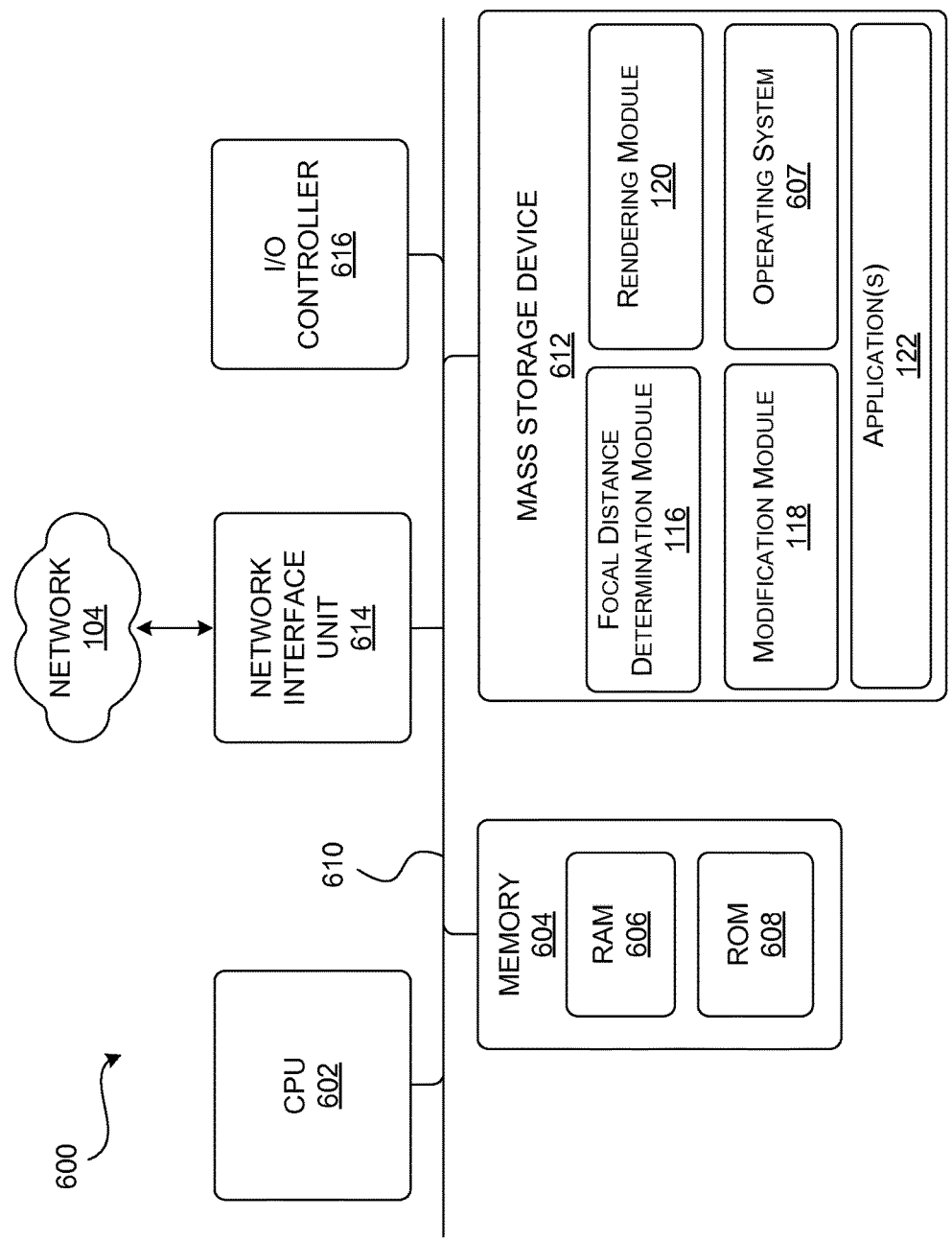
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as device 108, and/or server(s) 110 (FIG. 1), capable of executing the program components described above for controlling notifications based at least in part on the importance of the notifications to users. Thus, the computer architecture 600 illustrated in FIG. 6 illustrates an architecture for a server computer, a MR/AR display device, a mobile phone, a PDA, a smart phone, a desktop computer, a netbook computer, a tablet computer, and/or a laptop computer. The computer architecture 600 can be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 606, and a system bus 610 that couples the memory 604 to the CPU 602. A basic input/output system containing the basic routines that help to transfer information between elements within the computer architecture 600, such as during startup, is stored in the ROM 606. The computer architecture 600 further includes a mass storage device 612 for storing an operating system 607, and one or more application programs including but not limited to the focal distance determination module 116, the modification module 118, the image generation module 120, and application(s) 122.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

As described above, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 can operate in a networked environment using logical connections to remote computers through the network 104 and/or another network. The computer architecture 600 can connect to the network 104 through a network interface unit 614 connected to the bus 610. It should be appreciated that the network interface unit 614 also can be utilized to connect to other types of networks and remote computer systems. The computer architecture 600 also can include an input/output controller 616 for receiving and processing input from a number of other devices, including a keyboard, mouse, electronic stylus, sensors, tracking devices, etc. (not shown in FIG. 6). Similarly, the input/output controller 616 can provide output to a display screen, a printer, or other type of output device (also not shown in FIG. 6).

It should be appreciated that the software components described herein can, when loaded into the CPU 602 and executed, transform the CPU 602 and the overall computer architecture 600 from a general-purpose computing system into a special-purpose computing system customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 can include other types of computing devices, including hand-held computers, embedded computer systems, personal digital assistants, and other types of computing devices known to those skilled in the art. It is also contemplated that the computer architecture 600 may not include all of the components shown in FIG. 6, can include other components that are not explicitly shown in FIG. 6, or can utilize an architecture completely different than that shown in FIG. 6.

Figure 7:
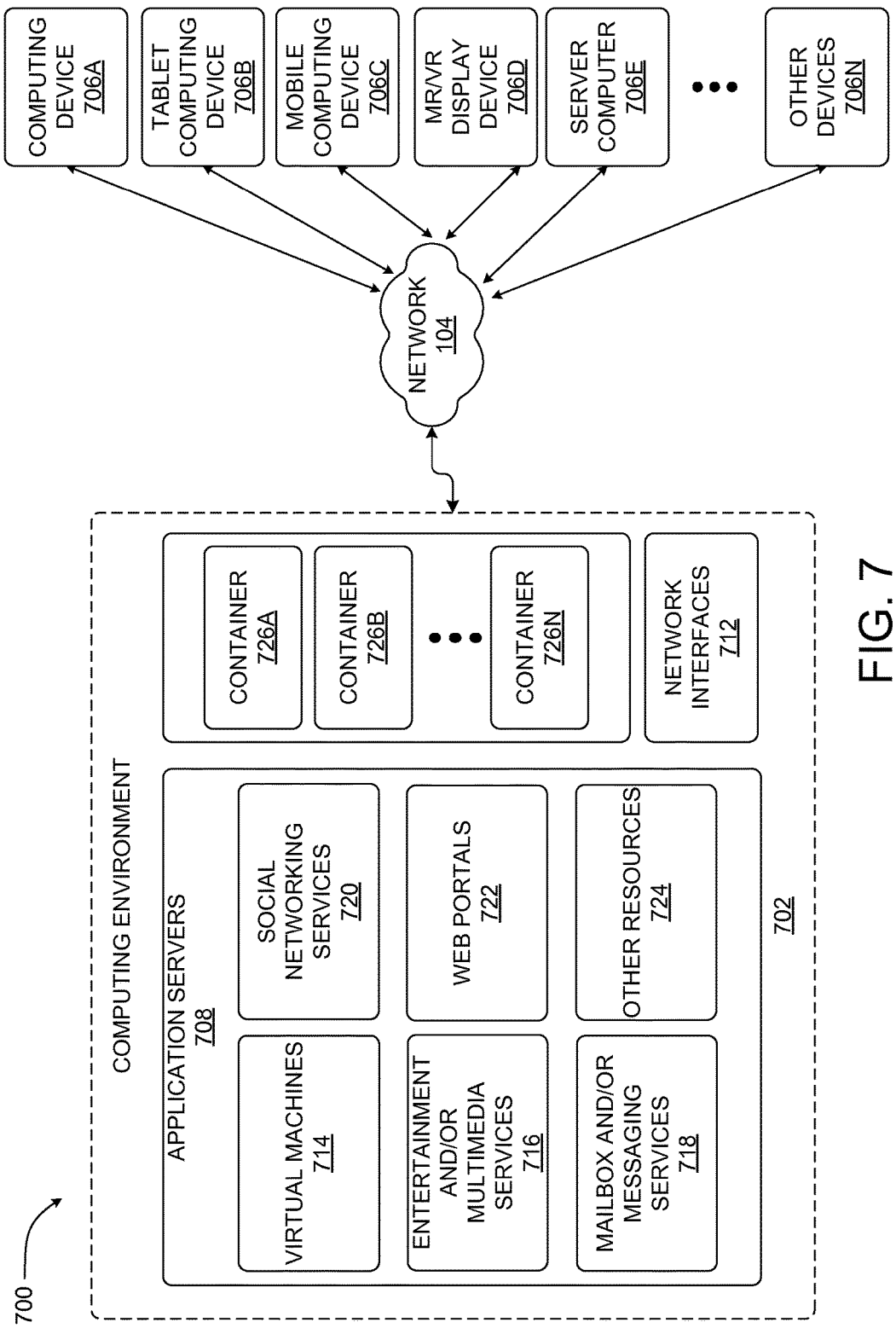
FIG. 7 is a diagram illustrating a distributed computing environment capable of implementing aspects of the techniques and technologies presented herein.

FIG. 7 depicts an illustrative distributed computing environment 700 capable of executing the software components described herein for generating multiple focal planes with identical image data that can be displayed at a substantially same time via a near-eye display device to generate the perception of varying focal depths, like those that are experienced in the real world. Thus, the distributed computing environment 700 illustrated in FIG. 7 can be utilized to execute any aspects of the software components presented herein. For example, the distributed computing environment 700 can be utilized to execute aspects of the focal distance determination module 116, the modification module 118, the image generation module 120, the application(s) 122 and/or other software components described herein.

According to various implementations, the distributed computing environment 700 includes a computing environment 702 operating on, in communication with, or as part of the network 104. The network 104 can be or can include the network 104, described above with reference to FIG. 6. The network 104 also can include various access networks. One or more client devices 706A-706N (hereinafter referred to collectively and/or generically as "clients 706") can communicate with the computing environment 702 via the network 104 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a MR and/or VR display device such as a near-eye display device, 706D; a server computer 706E; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 104. The application servers 708 can correspond to the application(s) 122 illustrated in FIG. 1. The application servers 708 can host various services, virtual machines, portals, and/or other resources. In the illustrated configuration, the application servers 708 can host one or more virtual machines 714 for executing applications or other functionality. According to various implementations, the virtual machines 714 can execute one or more applications and/or software modules for generating multiple focal planes with identical image data that can be displayed at a substantially same time via a near-eye display device to generate the perception of varying focal depths, like those that are experienced in the real world. It should be understood that this configuration is illustrative, and should not be construed as being limiting in any way.

The application servers 708 can also host or provide one or more services, such as entertainment and/or multimedia services 716, mailbox and/or messaging services 718, social networking services 720, etc. The entertainment and multimedia services 716 can include various music services, television and/or movie services, gaming services, e-book services, etc. The mailbox services and/or messaging services 718 can include electronic mail ("email") services, various personal information management ("PIM") services including, but not limited to, calendar services, contact management services, collaboration services, and/or other services. The mailbox and/or messaging services 718 can include, but are not limited to, instant messaging services, chat services, forum services, and/or other communication services.

The social networking services 720 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 720 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 720 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated. The social networking services 720 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services are not mentioned herein for the sake of brevity. As such, the above configurations are illustrative, and should not be construed as being limited in any way. According to various implementations, the social networking services 720 may host one or more applications and/or software modules for providing the functionality described herein for providing contextually-aware location sharing services for computing devices. For instance, any one of the application servers 808 may communicate or facilitate the functionality and features described herein. For instance, a social networking application, mail client, messaging client, a browser running on a phone or any other client 806 may communicate with a networking service.

The application servers 708 also host or provide access to one or more portals, link pages, Web sites, and/or other information ("Web portals") 722. The Web portals 722 can be used to communicate with one or more client computers.

As shown in FIG. 7, the application servers 708 also can host other services, applications, portals, and/or other resources ("other resources") 724. The other resources 724 can deploy a service-oriented architecture or any other client-server management software. It thus can be appreciated that the computing environment 702 can provide integration of the concepts and technologies disclosed herein provided herein with various entertainment, multimedia, mailbox, messaging, social networking, and/or other services or resources.

As mentioned above, the computing environment 702 can include the data storage 710. According to various implementations, the functionality of the data storage 710 is provided by one or more databases operating on, or in communication with, the network 104. The functionality of the data storage 710 also can be provided by one or more server computers configured to host data for the computing environment 702. The data storage 710 can include, host, or provide one or more real or virtual containers 726A-726N (hereinafter referred to collectively and/or generically as "containers 726"). The containers 726 are configured to host data used or created by the application servers 708 and/or other data. Although not illustrated in FIG. 7, the containers 726 also can host or store data structures and/or algorithms for execution by a module, such as the focal distance determination module 116, the modification module 118, the image generation module 120, etc. Aspects of the containers 726 can be associated with a database program, file system and/or any program that stores data with secure access features. Aspects of the containers 726 can also be implemented using products or services, such as ACTIVE DIRECTORY, DKM, ONEDRIVE, DROPBOX or GOOGLEDRIVE.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also can be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for generating multiple focal planes with identical image data that can be displayed at a substantially same time via a near-eye display device to generate the perception of varying focal depths, like those that are experienced in the real world, among other aspects. In one specific example, as summarized above, techniques described herein can be implemented, at least in part, by a web browser application that can work in conjunction with the application servers 708 of FIG. 7.

Turning now to FIG. 8, an illustrative computing device architecture 800 for a computing device that is capable of executing various software components described herein for generating multiple focal planes with identical image data that can be displayed at a substantially same time via a near-eye display device to generate the perception of varying focal depths, like those that are experienced in the real world. The computing device architecture 800 is applicable to computing devices that facilitate mobile computing due, in part, to form factor, wireless connectivity, and/or battery-powered operation. In some configurations, the computing devices include, but are not limited to, mobile telephones, MR/VR display devices, tablet devices, slate devices, portable video game devices, and the like. The computing device architecture 800 is applicable to any of the clients 706 shown in FIG. 7 (e.g., device 108). Moreover, aspects of the computing device architecture 800 can be applicable to traditional desktop computers, portable computers (e.g., laptops, notebooks, ultra-portables, and netbooks), server computers, and other computer systems, such as described herein with reference to FIG. 6 (e.g., server(s) 110).

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein also can be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 104 or another network, which can be a WWAN, a WLAN, or a WPAN. Although only the network 104 is illustrated, the network connectivity components 806 can facilitate simultaneous communication with multiple networks, including the network 104 of FIG. 7. For example, the network connectivity components 806 can facilitate simultaneous communications with multiple networks via one or more of a WWAN, a WLAN, or a WPAN.

The network 104 can be or can include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 can be configured to provide voice and/or data communications with any combination of the above technologies. The network 104 can be configured to or adapted to provide voice and/or data communications in accordance with future generation technologies.

In some configurations, the WWAN component 822 is configured to provide dual-multi-mode connectivity to the network 104. For example, the WWAN component 822 can be configured to provide connectivity to the network 104, wherein the network 104 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 104 can be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 104 via the WI-FI access points. Such connections can be secured via various encryption technologies including, but not limited, WI-FI Protected Access ("WPA"), WPA2, Wired Equivalent Privacy ("WEP"), and the like.

The network 104 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also can be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 828 are contemplated.

The accelerometer 834 is configured to measure proper acceleration. In some configurations, output from the accelerometer 834 is used by an application program as an input mechanism to control some functionality of the application program. For example, the application program can be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 can be used by any application program that requires or benefits from location information. For example, the location calculated by the GPS sensor 838 can be used with a navigation application program to provide directions from the location to a destination or directions from the destination to the location. Moreover, the GPS sensor 838 can be used to provide location information to an external location-based service, such as E911 service. The GPS sensor 838 can obtain location information generated via WI-FI, WIMAX, and/or cellular triangulation techniques utilizing one or more of the network connectivity components 806 to aid the GPS sensor 838 in obtaining a location fix. The GPS sensor 838 can also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 can include discrete processors configured to support the various interface described below, or can include processing functionality built-in to the processor 802.

The display 840 is an output device configured to present information in a visual form. In particular, the display 840 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device can have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 842. As such, a developer can create gestures that are specific to a particular application program.

In some configurations, the touchscreen 842 supports a tap gesture in which a user taps the touchscreen 842 once on an item presented on the display 840. The tap gesture can be used for various reasons including, but not limited to, opening or launching whatever the user taps. In some configurations, the touchscreen 842 supports a double tap gesture in which a user taps the touchscreen 842 twice on an item presented on the display 840. The double tap gesture can be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture can be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture can be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture can be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture can be used for various reasons including, but not limited to, zooming gradually in or out of a website, map, or picture.

Although the above gestures have been described with reference to the use one or more fingers for performing the gestures, other appendages such as toes or objects such as styluses can be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 can utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 852, which can be connected to a battery gauge 854. The batteries 852 can be rechargeable or disposable. Rechargeable battery types include, but are not limited to, lithium polymer, lithium ion, nickel cadmium, and nickel metal hydride. Each of the batteries 852 can be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector, which can be combined with one or more of the aforementioned I/O components 810. The power components 812 can interface with an external power system or charging equipment via a power I/O component.

The disclosure presented herein can be considered in view of the following clauses.

A. A system comprising: an image source for projecting image data onto at least one reflective optical surface, the image data corresponding to an image; and at least one reflective optical surface comprising an optical surface and a reflective surface, wherein: the optical surface causes a first copy of the image to be presented in a first focal plane; and the reflective surface causes a second copy of the image to be presented in a second focal plane at a substantially same time that the first copy of the image is presented in the first focal plane.

B. The system as paragraph A recites, wherein the at least one reflective optical surface comprises a secondary surface mirror.

C. The system as paragraph B recites, wherein: the optical surface is partially reflective; the at least one reflective optical surface causes copies of the image to be presented in three or more focal planes; and at least one focal plane of the three or more focal planes comprises the image data that is reflected by a front surface of the optical surface at least twice.

D. The system as any of paragraphs A-C recite, wherein the first copy of the image is associated with a first degree of sharpness and the second copy of the image is associated with a second degree of sharpness that is different from the first degree of sharpness.

E. The system as paragraph D recites, wherein the first focal plane corresponds to a desired focal plane and the first degree of sharpness causes the first copy of the image to appear in-focus.

F. The system as paragraph D recites, wherein the second focal plane corresponds to a focal plane that is not a desired focal plane and the second degree of sharpness causes the second copy of the image to appear out-of-focus.

G. The system as any of paragraphs A-F recite, wherein the at least one reflective optical surface is associated with a plurality of reflective optical surfaces that causes additional copies of the image to be presented in multiple focal planes in addition to the first focal plane and the second focal plane.

H. The system as paragraph G recites, wherein the additional copies of the image are perceived in individual focal planes of the multiple focal planes at the substantially same time.

I. The system as any of paragraphs A-H recite, further comprising: one or more processors; memory; and one or more modules stored in the memory and executable by the one or more processors to perform operations comprising: determining a desired focal distance; determining that the desired focal distance corresponds to the first focal plane; and generating the image for rendering by the image source in the first focal plane with a degree of sharpness that causes the image to appear sharp.

J. A computer-implemented method comprising: determining a desired focal distance; rendering an image including one or more virtual objects in a focal plane of multiple focal planes, wherein: individual ones of the individual focal planes of the multiple focal planes are generated by a corresponding optical surface of a plurality of reflective optical surfaces; and the focal plane corresponds to the desired focal distance; and based at least in part on rendering the image in the focal plane, causing copies of the image to be perceived in other focal planes of the multiple focal planes.

K. A computer-implemented method as paragraph J recites, further comprising rendering the image with a first degree of sharpness that causes the image to appear in-focus.

L. A computer-implemented method as paragraph K recites, wherein the copy of the image is associated with a second degree of sharpness that causes the copy of the image to appear out-of-focus.

M. A computer-implemented method as any of paragraphs J-L recite, further comprising rendering individual virtual objects of the one or more virtual objects with different degrees of sharpness based at least in part on a distance between the individual virtual objects and the desired focal distance.

N. A computer-implemented method as any of paragraphs J-M recite, wherein determining the desired focal distance is based at least in part on at least one of: accessing first data indicating a measurement of a shape of a lens of at least one of a left eye or a right eye of a user; accessing second data associated with a degree to which the left eye and the right eye rotate towards each other at a substantially same time; or utilizing heuristics to estimate the desired focal distance.

O. One or more computer-readable media encoded with instructions that, when executed by a processor, configure a computer to perform a method as any of paragraphs J-N recite.

P. A device comprising one or more processors and one or more computer readable media encoded with instructions that, when executed by the one or more processors, configure a computer to perform a computer-implemented method as any of paragraphs J-N recite.

Q. A computer-implemented method comprising: means for determining a desired focal distance; means for rendering an image including one or more virtual objects in a focal plane of multiple focal planes, wherein: individual ones of the individual focal planes of the multiple focal planes are generated by a corresponding optical surface of a plurality of reflective optical surfaces; and the focal plane corresponds to the desired focal distance; and means for, based at least in part on rendering the image in the focal plane, causing copies of the image to be perceived in other focal planes of the multiple focal planes.

R. A computer-implemented method as paragraph Q recites, further comprising means for rendering the image with a first degree of sharpness that causes the image to appear in-focus.

S. A computer-implemented method as paragraph R recites, wherein the copy of the image is associated with a second degree of sharpness that causes the copy of the image to appear out-of-focus.

T. A computer-implemented method as any of paragraphs Q-S recite, further comprising means for rendering individual virtual objects of the one or more virtual objects with different degrees of sharpness based at least in part on a distance between the individual virtual objects and the desired focal distance.

U. A computer-implemented method as any of paragraphs Q-T recite, wherein determining the desired focal distance is based at least in part on at least one of: accessing first data indicating a measurement of a shape of a lens of at least one of a left eye or a right eye of a user; accessing second data associated with a degree to which the left eye and the right eye rotate towards each other at a substantially same time; or utilizing heuristics to estimate the desired focal distance.

V. A device comprising: a plurality of reflective optical surfaces arranged on top of one another and configured to generate multiple focal planes; an image source for projecting image data onto the plurality of reflective optical surfaces, the image data corresponding to an image including one or more virtual objects; and one or more computer storage media having computer-executable instructions that, when executed by one or more processors, configure the one or more processors to perform operations comprising: generating the image for rendering by the image source in a focal plane of the multiple focal planes, the image having a first degree of sharpness that causes the image to appear in-focus; and based at least in part on the image source rendering the image in the focal plane, causing a copy of the image to be perceived in individual focal planes of the multiple focal planes at a substantially same time, wherein the copy of the image has a second degree of sharpness that is different from the first degree of sharpness and the second degree of sharpness causes the copy of the image to appear out-of-focus.

W. The device as paragraph V recites, wherein individual reflective optical surfaces of the plurality of reflective optical surfaces can be associated with a diffractive element.

X. The device as paragraph V or W recites, wherein the one or more computer storage media configure the one or more processors to perform operations further comprising: determining a desired focal distance; and determining that the desired focal distance corresponds to the focal plane.

Y. The device as paragraph X recites, wherein the one or more computer storage media configure the one or more processors to perform operations further comprising: determining that a first virtual object of the one or more virtual objects is positioned at the desired focal distance; and causing the image source to render the first virtual object with a third degree of sharpness that causes the first virtual object to appear sharp.

Z. The device as paragraph Y recites, wherein the one or more computer storage media configure the one or more processors to perform operations further comprising: determining that a second virtual object is positioned at another focal distance that does not correspond to the desired focal distance; and causing the image source to render the second virtual object with a fourth degree of sharpness that causes the second virtual object to appear out-of-focus.

AA. The device as any of paragraphs W-Z recite, wherein the copy of the image that is perceived in the individual focal planes at the substantially same time cause an aura to be perceived around the image.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A computer-implemented method comprising:
   determining a desired focal distance based at least in part on at least one of:
      accessing first data indicating a measurement of a shape of a lens of at least one of a left eye or a right eye of a user,
      accessing second data associated with a degree to which the left eye and the right eye rotate towards each other at a substantially same time, or
      utilizing heuristics to estimate the desired focal distance; and
   rendering an image including one or more virtual objects in a focal plane of multiple focal planes, wherein:
      individual ones of individual focal planes of the multiple focal planes are generated by a corresponding optical surface of a plurality of reflective optical surfaces; and
      the focal plane corresponds to the desired focal distance; and
   based at least in part on rendering the image in the focal plane, causing copies of the image to be perceived in other focal planes of the multiple focal planes.

2. A computer-implemented method as claim 1 recites, further comprising rendering the image with a first degree of sharpness that causes the image to appear in-focus.

3. A computer-implemented method as claim 2 recites, wherein a copy of the image is associated with a second degree of sharpness that causes the copy of the image to appear out-of-focus.

4. A computer-implemented method as claim 1 recites, further comprising rendering individual virtual objects of the one or more virtual objects with different degrees of sharpness based at least in part on a distance between the individual virtual objects and the desired focal distance.

5. A device comprising:
   a plurality of reflective optical surfaces arranged on top of one another and configured to generate multiple focal planes;
   an image source for projecting image data onto the plurality of reflective optical surfaces, the image data corresponding to an image including one or more virtual objects; and
   one or more computer storage media having computer-executable instructions that, when executed by one or more processors, configure the one or more processors to perform operations comprising:
      generating the image for rendering by the image source in a focal plane of the multiple focal planes, the image having a first degree of sharpness that causes the image to appear in-focus; and
      based at least in part on the image source rendering the image in the focal plane, causing a copy of the image to be perceived in individual focal planes of the multiple focal planes at a substantially same time, wherein the copy of the image has a second degree of sharpness that is different from the first degree of sharpness and the second degree of sharpness causes the copy of the image to appear out-of-focus.

6. The device as claim 5 recites, wherein individual reflective optical surfaces of the plurality of reflective optical surfaces can be associated with a diffractive element.

7. The device as claim 5 recites, wherein the one or more computer storage media configure the one or more processors to perform operations further comprising:
   determining a desired focal distance; and
   determining that the desired focal distance corresponds to the focal plane.

8. The device as claim 7 recites, wherein the one or more computer storage media configure the one or more processors to perform operations further comprising:
   determining that a first virtual object of the one or more virtual objects is positioned at the desired focal distance; and
   causing the image source to render the first virtual object with a third degree of sharpness that causes the first virtual object to appear sharp.

9. The device as claim 8 recites, wherein the one or more computer storage media configure the one or more processors to perform operations further comprising:
   determining that a second virtual object is positioned at another focal distance that does not correspond to the desired focal distance; and
   causing the image source to render the second virtual object with a fourth degree of sharpness that causes the second virtual object to appear out-of-focus.

10. The device as claim 5 recites, wherein the copy of the image that is perceived in the individual focal planes at the substantially same time cause an aura to be perceived around the image.

11. A system comprising:

an image source for projecting image data onto a plurality of reflective optical surfaces forming a stack, the image data corresponding to an image;

at least one reflective optical surface of the plurality of reflective optical surfaces comprising an optical surface and a reflective surface, wherein:

the optical surface causes a first copy of the image to be presented in a first focal plane; and the reflective surface causes a second copy of the image to be presented in a second focal plane at a substantially same time that the first copy of the image is presented in the first focal plane;

one or more processors; and memory including instructions executable by the one or more processors to perform operations comprising:

determining a desired focal distance;

determining that the desired focal distance corresponds to the first focal plane; and generating the image for rendering by the image source in the first focal plane with a degree of sharpness that causes the image to appear sharp.

12. The system as claim 11 recites, wherein the at least one reflective optical surface comprises a secondary surface mirror.

13. The system as claim 12 recites, wherein:

the optical surface is partially reflective;

the at least one reflective optical surface causes copies of the image to be presented in three or more focal planes; and at least one focal plane of the three or more focal planes comprises the image data that is reflected by a front surface of the optical surface at least twice.

14. The system as claim 11 recites, wherein the first copy of the image is associated with the degree of sharpness as a first degree of sharpness and the second copy of the image is associated with a second degree of sharpness that is different from the first degree of sharpness.

15. The system as claim 14 recites, wherein the first focal plane corresponds to a desired focal plane and the first degree of sharpness causes the first copy of the image to appear in-focus.

16. The system as claim 14 recites, wherein the second focal plane corresponds to a focal plane that is not a desired focal plane and the second degree of sharpness causes the second copy of the image to appear out-of-focus.

17. The system as claim 11 recites, wherein the plurality of reflective optical surfaces cause additional copies of the image to be presented in multiple focal planes in addition to the first focal plane and the second focal plane.

18. The system as claim 17 recites, wherein the additional copies of the image are perceived in individual focal planes of the multiple focal planes at the substantially same time.

* * * * *